Patented Apr. 24, 1951

2,550,650

UNITED STATES PATENT OFFICE 2,550,650

PROCESS OF PRODUCING A PLASTIC COMPOSITION FROM WASTE NYLON FIBERS

Orlan M. Arnold, Grosse Pointe Park, Mich.

No Drawing. Application September 19, 1945,
Serial No. 617,432

1 Claim. (Cl. 260—45.5)

This invention relates to polyamide plastics, especially of condensation polymers of adipic acid and alkylene diamine commonly known as nylon and to processes of using the same. Although nylon has for some time been in wide use and its scrap an article of commerce, the use of such scrap has been mostly limited to use as rags or as used fiber for re-spinning of textile yarns, thread, etc., and to chemical treatment for reforming of adipic acid as a raw material in the poly-condensation reaction by which the nylon is reformed. As a consequence the scrap value of nylon has been limited on the one hand by its value as used fiber for release and re-spinning in textiles and on the other hand by the cost of adipic acid production from other sources as compared to its cost of reclaiming from scrap nylon. I have now found that nylon scrap can be made more valuable by direct use as a raw material in production of various plastics, films and filaments, and for treatment of other textile products.

Among the objects of the invention, therefore, are the more effective use of scrap polyamide fibers, the provision of improved processes of forming polyamide fibers into useful articles, the provision of modified polyamides having highly advantageous and unsuspected characteristics.

I have found that replasticized nylon possesses an extraordinary cohesion and that this quality adapts it for the formation of particularly hard and tough molded articles, sheets, films and the like; and I have now found that for a wide number of uses nylon scrap may be employed directly with very simple treatment. I have also found that for a number of molding purposes the direct use of scrap nylon material gives a stronger and otherwise improved product.

Scrap nylon may be plasticized, extruded, or otherwise molded in massive shapes, or extruded through narrow orifices, or spinnerettes and stretched to provide new fibers directly.

Defective unused fibrous articles, cuttings from nylon cloth and mill scrap of various kinds represent top quality substantially undegraded nylon. Used stockings provide a particularly good source of waste polyamide material because of their short active life and relatively small degradation by use. Parachute cloth is a good source for similar reasons. Brushes, underwear and miscellaneous rags represent types of scrap having relatively greater degradation of the polymer. Any such scrap nylon material is thoroughly cleaned before use in my invention.

The washed fiber either in the form of rag or after releasing the fibers with or without reforming them into a bat or felt or sliver or other fabric is then re-formed by application of heat and pressure. Although it had been known before my invention that nylon would soften and become more or less plastic at high temperatures, this has not before appeared as useful knowledge because of the serious deterioration and degradation of the nylon which resulted from such treatment. I have now found that such deterioration occurs not only by rapid oxidation at such high temperatures, but also by mere action of the high temperature itself even in the absence of oxygen. According to my invention, therefore, the polyamide material is heated only for a very brief period just long enough for shaping to the desired physical form, and that in the absence of oxygen, or substances are added which serve to a greater or less extent to avoid the degradation which would occur in remolding the nylon alone.

Although it is possible to remold the nylon scrap directly into massive products by pressing in an inert atmosphere, e. g., nitrogen, or in a vacuum, and then heating quickly and for a period just long enough to assure fusing together of the fibers, e. g., by a high-frequency treatment or by pressing in an extrusion apparatus through a heated zone and thence quickly into a cooler inert bath or atmosphere (if extruded shapes are being formed) or into an injection mold (if massive objects are being formed), it is more advantageous to treat the fibers by applying to their surfaces special materials according to this invention. Styrene, either in monomeric or, advantageously, polymeric form, is particularly advantageous for such treatment.

As one example of this, styrene which had been polymerized to a stiff varnish consistency and then dissolved in benzene has been applied to nylon stockings, e. g., by dipping and draining and then evaporating the benzene. The resulting styrene-coated fabric has then been effectively molded under from 100 to 200 lbs. pressure at from 250 to 270° C. for 20–25 min. The result is a hard, tough resilient product of excellent texture, free from blowholes and very highly temperature resistant, and has greater water-resistance than untreated nylon. Another characteristic is a very low conductivity and the holding of electric charges very tenaciously. Products having similar desirable characteristics may be similarly formed with commercial polystyrene instead of the partially polymerized material mentioned above. Dishes formed in this way are so hard and tough that they can be thrown on concrete with sufficient force so that they will bounce 9 feet without injury to the dishes beyond a surface scratching.

As another example, nylon parachute cloth was thoroughly washed and freed from grease and oily film. 110 parts by weight of the cloth was then subjected to a solution of 8 parts by weight of polystyrene crystals dissolved in 335 parts by weight of benzene and the benzene evaporated off. The cloth thus treated was placed in a closed heated mold cavity and molded under the same conditions of time, temperature and pressure. Articles of excellent quality were thus produced, the product being tough, smooth, light in color, and of such resiliency that it will not chip or break when bounced on concrete.

As another example: one part by weight of white crystalline polystyrene was ground up with 20 parts of nylon stocking scrap in a Banbury with circulation of cold water in the jackets and rotors, and the resulting powder is then molded with effective results.

As another example: nylon stocking scrap was treated with a solution of 40 grams crystalline polystyrene per liter in benzene. The benzene was evaporated leaving a uniformly distributed polystyrene coating on the nylon fibers 8% by weight of the nylon. The treated fabric was then molded by heat and pressure to produce a hard, tough, smooth, resilient product which could be bounced from a concrete floor without chipping or cracking. Excellent results were obtained with various ranges of polystyrene from 2% to 10%. Higher percentage may be used, but as the proportion is increased to 50% brittleness and shrinkage tendency are increased. Temperatures of from 150° to 200° C. have proved most satisfactory for molding, but the procedure may be carried out at much higher temperatures or as low as 125° C.

Polystyrene may also be melted and scrap nylon immersed in the molten styrene product, or the molten styrene otherwise applied to the polyamide waste. I have found that the nylon dissolves in fully or partially polymerized styrene at 130° C. or above, and apparently reacts with either monomer or polymer.

When unpolymerized styrene is used it is ordinarily converted to a solid polymeric form by polymerization (probably at least in part copolymerization or cross-linking) with the polyamide.

Styrene whether in monomeric or polymeric form provides a highly effective agent for use with scrap nylon. The styrene not only serves as a plasticizer facilitating molding or other forming of the plastic, but it also serves to protect the polyamide material from decomposition and degradation by high temperatures. This is of high importance since nylon tends to oxidize readily and, in some instances, to decompose under conditions which facilitate polymerization. The styrene—advantageously in polymeric form—may be applied so as to form a thin film around each of the polyamide fibers and it may be that when heat is applied, such film at least partially excludes oxygen from the polyamide fibers. It seems more likely, however, that the protection is chemical rather than—or as well as—physical. Oxygen is known to initiate or catalyze polymerization of styrene, and it seems probable that oxidizing conditions which would ordinarily cause degradation of the polyamide, in the presence of styrene initiate or catalyze a cross-bonding or copolymerization resulting in the improvement in physical and electrical properties as mentioned above. Nevertheless, it is advantageous to heat even this material in an inert atmosphere.

Used nylon stockings were soaked in raw or partially polymerized styrene (advantageously containing 10% polymer and about 90% monomer) in proportion of 2–3 parts by weight of styrene to 1 part of nylon. At room temperature no effect other than wetting is evident; but, when heated to 130° C. or above under inert atmosphere or in a closed system, the nylon appears to go into solution rapidly in the partial polymer more gradually in the monomer, as it polymerizes at that temperature. Although this phenomena is not conclusively identified, it is believed that actually there is a cross-bonding and/or additional reaction of the styrene with the polyamide so that the "solution" is in part at least chemical rather than a mere physical dispersion. A changing odor in the material gives further evidence of the chemical change occurring.

The polyamide fiber-styrene liquid mixture described above can be molded to excellent solid articles in molds heated to 200°–225° C. or after treatment en masse at temperatures above 130° C. as described above can be drawn out into fibers in an inert bath or atmosphere.

I have found also that cellulose esters, especially cellulose acetate, can be added to such compositions with outstanding advantages. Thus, for example, I have found that cellulose acetate in proportion of about 2–30% based on the polyamide will when applied to polyamide fiber, as more particularly set forth in my copending application (Serial No. 617,433, filed September 19, 1945), not only protect the polyamide from oxidation at elevated temperatures, but when molded under heat and pressure will give a hard, uniform product, smooth and readily machineable and with excellent physical properties and electrical properties for insulating and dielectric uses. Such compositions can also be softened by heat, extruded through a narrow opening and drawn out into excellent fibers.

Plasticizers, such as the toluene para and ortho sulfonamide sold commercially as Santicizer S9, may be used with advantage in such compositions.

When cellulose acetate is added to polyamide-styrene compositions such as are mentioned above an extraordinary quality is produced. The product is hard, smooth, low distortion, light, resilient, resistant to heat and chemical attack. As one example, a plastic was prepared by the use of 160 grams of polyamide in the form of waste nylon stocking to which 16 grams of acetate fiber were added and 8 grams of crystalline white polystyrene. The mixture was ground to a powder in a Banbury cooled with water. The heating was local and much reduced. Variations may be made in the composition, particularly the amount of acetate or even polystyrene. The mass was heated in a 1" mold and produced a test disc of the high qualifications. More than one effect is experienced in this co-blending. As I have shown before, the polyamide is soluble in hot polystyrene so there is realized a solution of one species in the other and then there is the combination in a chemical manner of one polymer with the other. This may be the addition of long groups such as the polystyrene chain chemically bound to the polyamide chain such as the amide group. There may be reactions involving the cellulose acetate. In any event the product is good. It may also be possible that the polystyrene molecules partially polymerized or completely polymerized may react with a group in the cellulose acetate.

This combination of polyamide, cellulose acetate and polystyrene gives a unique way of producing plastics of special property. The polyamide tends to keep the softening point high and reduce distortion. The polystyrene helps to reduce the effect of moisture and the cellulose acetate improves the texture. The oxidation of the polyamide such as from nylon waste or new material is greatly reduced by the presence of the other two. This gives an outlet for the use of waste fibrous material, woven or open, to be converted into a useful plastic material. The composition may be considerably varied to control the nature of the product desired.

Other plasticizers may be used which do not appear to react in the same manner with the polyamide, but to protect it partly by a protective coating (as already suggested in the case of styrene) and/or by lowering the softening point to a temperature at which the polyamide is not seriously deteriorated.

Triphenyl-phosphate is such a plasticizing agent which may be used alone or in conjunction with styrene (either monomer or polymer).

The chlorinated diphenyl plasticizers are particularly useful for such purpose. For example, waste nylon stocking material was dipped in a solution in 80 grams of carbon tetrachloride of 10 grams of the chlorinated diphenyl commercially available under the name "Arochlor 1248" from Monsanto Chemical Company, and then drained. When heated on a hot plate the solvent evaporated and there was produced a gooey mass which was effectively and satisfactorily drawn out into films and filaments.

If a polyamide fiber substantially unplasticized, i. e., with higher softening point, is required, the fiber may be extruded into and stretched in a bath of carbon tetrachloride or other solvent of the plasticizer, which can be maintained at an intermediate temperature, e. g., 70–120° C., preferably in a closed system to prevent loss of vapors.

As another example: 15 parts of weight of waste nylon textile was dipped into a solution of 15 parts by weight of "Monsanto Arochlor 1262" (a highly chlorinated diphenyl) in 80 parts by weight of carbon tetrachloride. The impregnated nylon textile was then hung up to dry. When the carbon tetrachloride had completely vaporized, the material was placed in a mold and heated until the material was softened, and was then kept under pressure while being cooled. The product was a very hard, tough, smooth-surfaced plastic having high fidelity of reproduction of even minute detail in the mold.

A 20–30% solution of chlorinated diphenyl is ordinarily best, though this may be varied from 15% to 60% in many instances without significant loss of effectiveness. In many instances, the use of a solvent can be eliminated and the plasticizer heated with the dry fibers.

Texture of the finished product can be varied by the proportion of plasticizer as well as the nature of the plasticizer of plasticizers used. Excessive heat tends to give porosity.

Certain other plasticizers give effective and, in some instances, even better results than the chlorinated diphenyl. Adipic acid and adipates, like styrene, appear to combine a physical plasticizing effect with a chemical bonding or cross-linking which seems to offset or avoid any degradation of the polyamide which may occur. Dibutyl adipate is especially effective. Hexyl adipate is also highly effective. Other dicarboxylic acids may be similarly used. Similar good results have been obtained with benzoic acid and its amino, hydroxy and chloro derivatives. Of these the amino benzoic acid and amino benzoates have given the best results and the chloro derivatives the poorest. These derivatives are useful in either their meta, para or ortho arrangement.

By adding plasticizer to the surface of stretched nylon fiber (e. g., ordinary textile nylons) and controlling the subsequent mechanical treatment to stop short of the point where all of the polyamide material present is plasticized, or by introducing unplasticized nylon fibers into a preplasticized batch of waste nylon, there can be formed molded sheets and articles of such high strength that they are useful as armor and can find general application wherever particularly strong, durable and non-porous plastics are desired. Even though the surfaces of practically all the fibers are plasticized and some of the fibers may be wholly plasticized, the cores of many of the fibers will retain their molecular orientation to such extent as to greatly increase the strength of the product as compared with a wholly disoriented body of the same plastic. This feature is broadly described and claimed in my copending application Serial No. 416,989, filed October 29, 1941, now U. S. Patent No. 2,433,727. In some cases the fibrous nature may be so far retained notwithstanding merging of the fibers into a solid product that an image of the fabric can be seen clearly in the molded product.

When it is more practical to plasticize fully all the polyamide, or when greater resistance to fire, heat or other factors is required, there may be embodied in the molded, extruded or other product suitable insert fibers such, for example, as asbestos fibers, metal fibers and glass fiber. The polyamide is particularly adapted for such reinforcement because of its tenacious adherence to the inorganic filaments. Such materials possess a special advantage over textile fibers since the latter tend to deteriorate under the high temperatures (e. g., 125 to 175° C. above the softening temperatures of cellulose acetate) commonly required for the softening of nylon. Other finely divided heat-resistant inorganic materials may be added as fillers or pigments to the polyamide composition.

Such products formed in accordance with the invention are, because of their high melting point, adapted for use under heat conditions which would destroy ordinary thermoplastics. If a particularly high fusion-point product is desired, the quantity of plasticizer present, and particularly the quantity of styrene, should be kept low.

Products containing inert fibers and replasticized nylon find great usefulness in a wide variety of products ranging from nylon plastics reinforced with inert fibers to mats of chopped wire, asbestos, and the like bonded with replasticized nylon or solutions thereof. Such materials and especially mats intermediate these two extremes and composed, for example, of considerable quantities of both replasticized nylon and metallic fibers such, for instance, as chopped wire are very useful for self-locking nuts, e. g., the "elastic stop-nuts" because of their elasticity, and find special application where such nuts are used in positions subject to high temperatures. These and similar products containing fiber glass, asbestos or the like have many applications including their use as sound deadening structures.

As above indicated, the invention in certain of its more specific aspects contemplates the plasticization and molding of polyamides in the absence of any substantial amount of oxygen. To this end the scrap material may be degassed in a substantial vacuum and/or the treatment may be carried out in the presence of nitrogen, molecular hydrogen, or other gas which is inert with respect to the scrap material. In other instances such procedures may be replaced in whole or in part of may be supplemented by the presence of a protective plasticizer such, for example, as styrene, as referred to above.

Although I have referred above particularly to molding of massive articles, these compounds according to my invention when fully plasticized may be re-spun into fibers, e. g., by extrusion through a narrow orifice of spinnerette into an inert atmosphere or bath. Wholly or partially plasticized nylon and other polyamide plastics lend themselves admirably, with my present invention, to high pressure injection molding and to extrusion of massive shapes. In all of these, as suggested above, I find it advantageous to subject the material to the high heat, which is necessary for the final forming, only briefly and while the material is confined and under high pressure, as for example while passing through a zone in the injection or extrusion nozzle.

Stronger products are obtained when the material is cooled slowly or held at an elevated temperature shomewhat below the softening temperature but above 80° C. Extruded filaments may be passed into a hot inert bath, e. g., of paraffin oil and stretched out to the desired denier and reeled while still immersed, subsequently being transferred to a cooler washing bath in which excess oil is removed.

Scrap nylon may be used in the form of cloth, suitably cut or shredded textile material, open fibers, cord, thread, or in other suitable form. In many instances the new products are of sufficient value to warrant their manufacture from newly formed nylon, but waste nylon is of course desirable for use from the standpoint of economy.

The invention in certain of its more specific aspects contemplates facilitating the bonding action and improving the product by the inclusion in the mix of materials which assist in the formation of large molecules by cross-bonding and additional polymerization or end-bonding, thus offsettting tendencies toward degradation, and making more stable the ends of the polyamide complexes. To this end various materials and particularly styrene, and other vinyl linkage type polymers and the materials used in the original formation of polyamide complexes may be employed.

The invention is also adapted for the direct re-use of nylon by extrusion of the plasticized waste product. To this end the plasticized nylon may be extruded through a nozzle heated to 240° C. into an inert bath or atmosphere adapted to control the rate of cooling. It is desirably extruded into (and in the case of fibers stretched out) in an inert non-solvent substance in the gaseous or liquid phase, e. g., nitrogen, molecular hydrocarbon, non-reactive hydrocarbon oils, or even water, with the temperature kept in the neighborhood of 100° C. or higher, in any case above 80° C. Filaments varying from coarse to very fine, sheets, films, rods, and other products may be thus formed. Rapid extrusion and rapid stretching are important since tendencies toward deterioration ensue from an unduly prolonged maintenance of high heat.

A partial vacuum during the pressing and heating steps of the various procedures contemplated by the invention will assist in eliminating any tendencies toward bubble formation, as well as reducing deleterious effects of oxygen. A good vacuum is also of advantage in reducing heating of the material before it reaches the heated zone at the nozzle.

Anti-oxidants can be added to the fiber with or without the plasticizer to further control oxygen effects during the heating stop.

The compositions of the present invention may also be made into films, filaments or coatings by solution in accordance with the invention described and claimed in my copending application Serial No. 617,434 filed herewith.

Although I have given above certain specific examples of my invention and its application in practical use and am giving also certain modifications and alternatives, it should be understood that these are not intended to be exhaustive or to be limiting of the invention. On the contrary I am giving these as illustrations and am giving explanations herein in order to acquaint others skilled in the art with my invention and the principles thereof and a suitable manner of its application in practical use, so that others skilled in the art may be enabled to modify the invention and to adapt it and apply it in numerous forms, each as may be best suited to the requirement of a particular use.

What is claimed is:

A process of producing polyamide plastics which comprises applying to the exterior surfaces of waste nylon fibers composed essentially of polyhexamethylene adipamide a solvent solution of polystyrene, evaporating said solvent to deposit a coating of polystyrene on said fibers, and heating and pressing said fibers together to form them into a molten mass capable of being extruded to form new fibers.

ORLAN M. ARNOLD.

REFERENCES CITED

The following references are of record in the file of this patent:

UNITED STATES PATENTS

| Number | Name | Date |
| --- | --- | --- |
| 2,071,250 | Carothers | Feb. 16, 1937 |
| 2,130,948 | Carothers | Sept. 20, 1938 |
| 2,249,686 | Dykstra | July 15, 1941 |
| 2,298,274 | Boeddinghaus | Oct. 13, 1942 |
| 2,302,332 | Leekley | Nov. 17, 1942 |
| 2,323,334 | Kauth | July 6, 1943 |
| 2,336,797 | Maxwell | Dec. 14, 1943 |
| 2,343,089 | Smith | Feb. 29, 1944 |
| 2,357,392 | Francis | Sept. 5, 1944 |
| 2,395,396 | Conaway | Feb. 26, 1946 |
| 2,433,727 | Arnold | Dec. 30, 1947 |